United States Patent [19]
Lillard

[11] Patent Number: 5,332,345
[45] Date of Patent: Jul. 26, 1994

[54] VEHICLE CARRIER

[76] Inventor: Dale R. Lillard, Rte. 1, Box 512, Lebanon, Mo. 65536

[21] Appl. No.: 865,965

[22] Filed: Apr. 9, 1992

[51] Int. Cl.$^5$ ............................................... B60P 3/08
[52] U.S. Cl. ........................................ 410/29.1; 410/26
[58] Field of Search ................. 410/24, 24.1, 25, 26, 410/27, 28, 28.1, 29, 29.1, 4, 3

[56] References Cited

U.S. PATENT DOCUMENTS

| | | | |
|---|---|---|---|
| 2,684,264 | 7/1954 | Demos | 410/29.1 X |
| 2,695,810 | 11/1954 | Demos | 410/26 |
| 3,084,970 | 4/1963 | Day | 410/29.1 |
| 3,104,127 | 9/1963 | Swartzwelder | 410/29.1 |
| 3,913,496 | 10/1975 | Lohr | 105/368 |
| 3,960,401 | 6/1976 | Harold | 410/28 |
| 3,994,523 | 11/1976 | Harold | 410/28 X |
| 4,081,196 | 3/1978 | Dandridge, Jr. | 410/24.1 X |
| 4,106,805 | 8/1978 | Harold | 410/26 |
| 4,172,612 | 10/1979 | Kinard | 410/29.1 |
| 4,221,420 | 9/1980 | Vencill et al. | 296/1 A |
| 4,221,422 | 9/1980 | Harold | 410/24.1 |
| 4,369,008 | 1/1983 | Cooper | 410/29.1 |
| 4,668,142 | 5/1987 | Fity et al. | 410/26 |
| 4,701,086 | 10/1987 | Thorndyke | 410/26 |
| 4,932,830 | 6/1990 | Woodburn | 414/495 |
| 4,992,013 | 2/1991 | Westerdale | 410/29.1 |
| 5,051,046 | 9/1991 | Oren | 410/29.1 |

Primary Examiner—Michael S. Huppert
Assistant Examiner—James T. Eller, Jr.
Attorney, Agent, or Firm—Senniger, Powers, Leavitt & Roedel

[57] ABSTRACT

A vehicle carrier having a chassis on which is carried lower vehicle supports, first mechanisms mounting the lower vehicle supports on the chassis, and upper vehicle supports disposed generally above the lower vehicle supports. The upper vehicle supports include a plurality of upper platforms, and second mechanisms mounting the upper vehicle supports on the chassis for movement of each of the upper platforms relative the chassis independently of the other upper platforms. The upper platforms move between a lowered position adjacent the lower vehicle supports and the chassis, a raised position spaced above the lower vehicle supports and the chassis, a forwardly tilted position and a rearwardly tilted position relative the chassis.

7 Claims, 5 Drawing Sheets

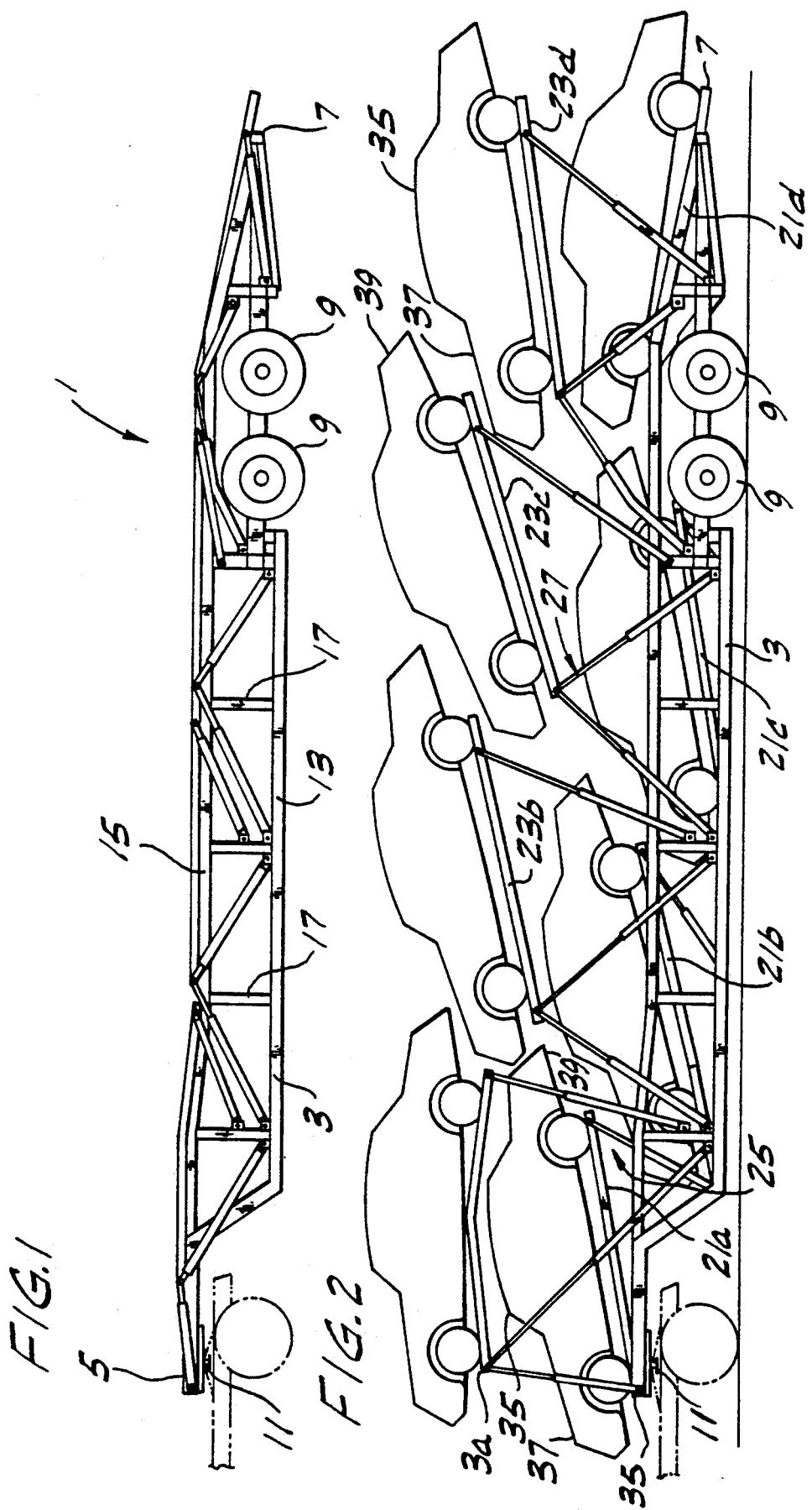

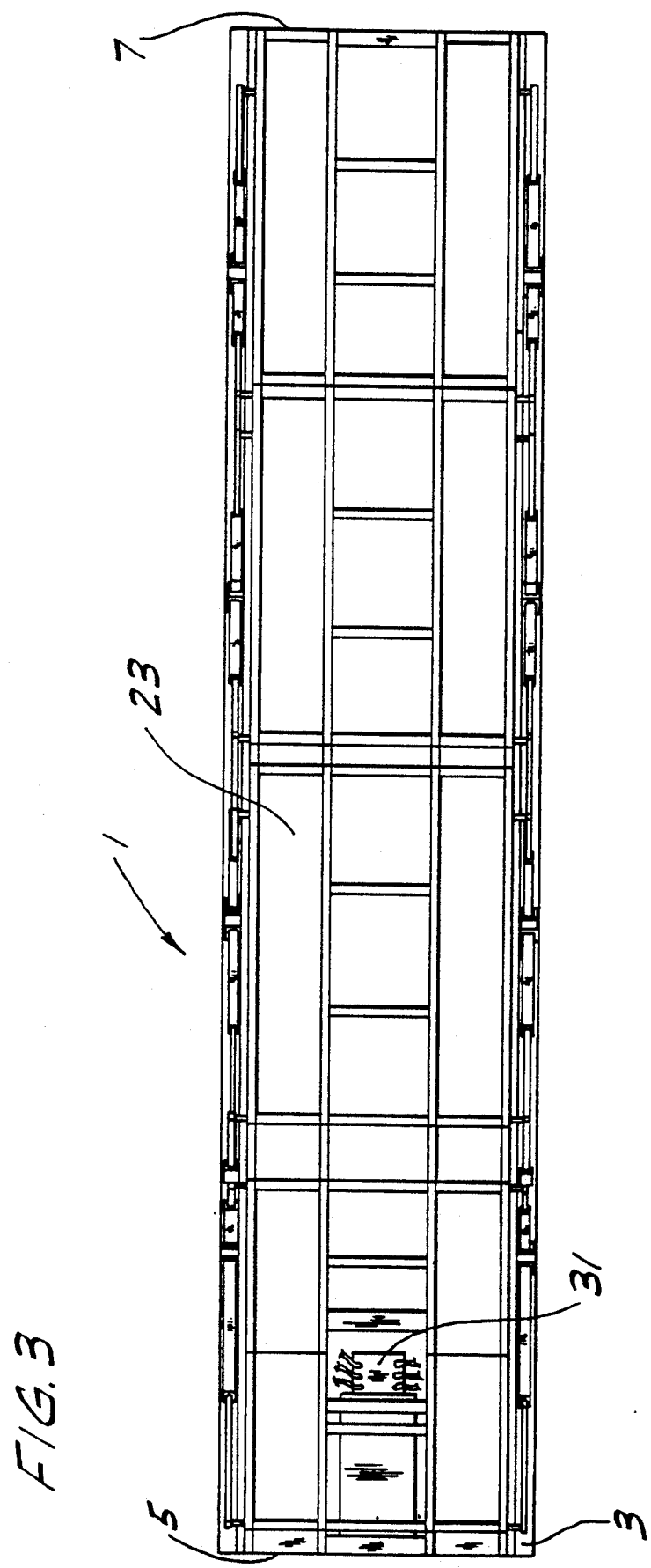

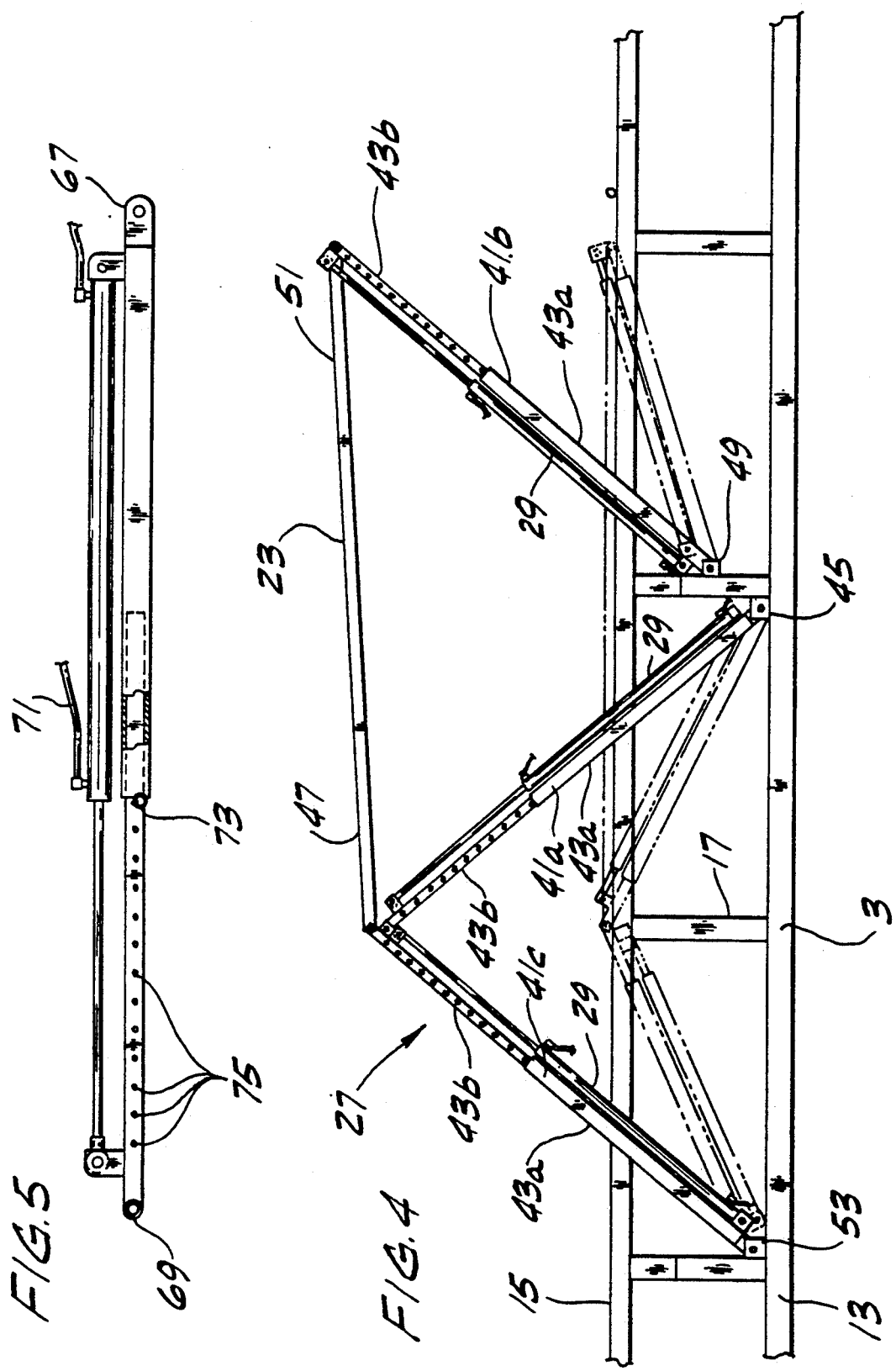

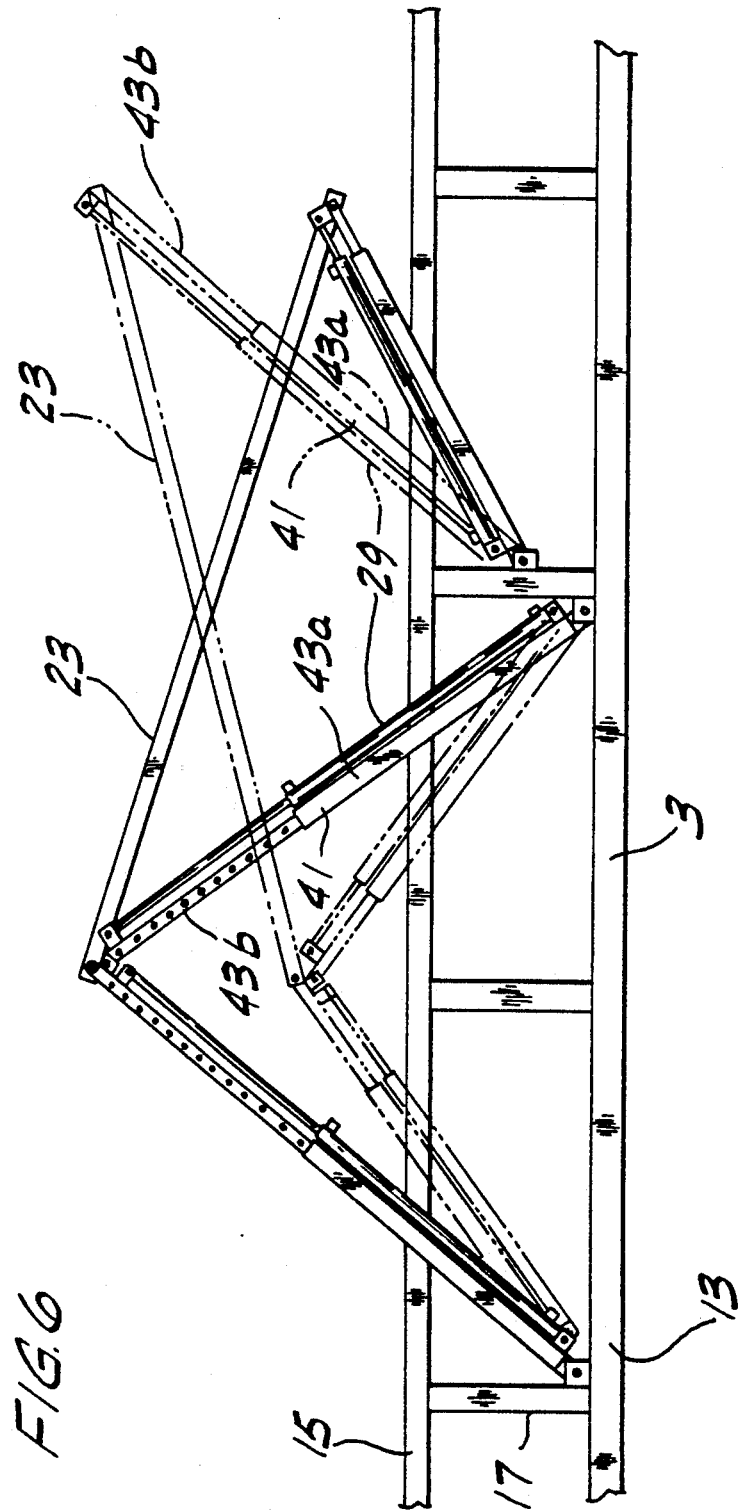

VEHICLE CARRIER

SUMMARY OF THE INVENTION

This invention relates generally to trailers and more particularly to a vehicle carrier for carrying automobiles, trucks and the like.

Presently, there are vehicle carriers of the type pulled by a tractor having multiple levels, typically a lower level which is immediately above the chassis of the vehicle carrier and an upper level above the lower level. In some of these carriers, vehicles are loaded on the upper level when it is in a lowered position. After loading, the upper level is then raised to its transport position in which vehicles may then be loaded on the lower level. Vehicles are loaded on the upper and lower levels and secured for transport with the front end of each vehicle immediately behind the rear end of the vehicle in front of it. Because the vehicles are arranged one after another generally in a line, valuable space is wasted between the lower and upper levels.

In some of these carriers, vehicles are first loaded on the raised upper level by means of a series of ramps in which a driver drives a vehicle directly on the raised upper level. Typically, the upper level may be as high as thirteen feet above the ground, thus, the driver must carefully exit the vehicle and secure the vehicle to the platform so that the vehicle is immobile during its transport. In many instances, this may be a dangerous task because of the height at which the vehicle is being immobilized and space constraints involved.

Accordingly, among the several objects of this invention may be noted the provision of an improved vehicle carrier capable of transporting a plurality of vehicles such as automobiles, trucks and the like in a compact arrangement; the provision of such an improved carrier with improved wind resistance which results in fuel economy; the provision of such an improved carrier in which vehicles may easily be secured thereto while standing on the ground; the provision of such an improved carrier which provides a frame or chassis which is lower to the ground for easy loading and unloading of vehicles; the provision of such an improved carrier which may transport a variety of different sized vehicles; and the provision of such an improved carrier which is simple in design and construction.

Generally, a vehicle carrier constructed according to the principles of the present invention comprises a chassis having a front end and a rear end. Wheels are mounted on the chassis for rotation relative thereto and for supporting at least a portion of the chassis. The carrier further comprises lower vehicle support means, first means mounting the lower vehicle support means on the chassis, upper vehicle support means disposed generally above the lower vehicle support means. The upper vehicle support means comprises a plurality of upper platforms, and second means mounting the upper vehicle support means on the chassis for movement of each of the upper platforms relative the chassis independently of the other upper platforms. The upper platforms move between a lowered position adjacent the lower vehicle support means and the chassis, a raised position spaced above the lower vehicle support means and the chassis, a forwardly tilted position and a rearwardly tilted position relative the chassis. Power means associated with the second mounting means powers the movement of the upper platforms.

Other objects and features will be in part apparent and in part pointed out hereinafter.

BRIEF DESCRIPTION OF THE DRAWINGS

FIG. 1 is a side elevation of a car carrier showing upper platforms thereof in a lowered position;

FIG. 2 is a side elevation of the car carrier shown in FIG. 1 with its upper platforms in their raised position and both the upper and lower platforms having vehicles secured thereto;

FIG. 3 is a plan view of the car carrier;

FIG. 4 is a fragmentary side elevation of the carrier showing an upper platform in its raised position with its lowered position shown in phantom;

FIG. 5 is a detail of a telescopic arm used to raise an upper platform;

FIG. 6 is a fragmentary side elevation of the carrier like FIG. 4 showing the upper platform in its rearwardly tilted position with its forwardly tilted position shown in phantom;

Corresponding reference characters indicate corresponding parts throughout the several views of the drawings.

DETAILED DESCRIPTION OF THE PREFERRED EMBODIMENT

Figure 7:
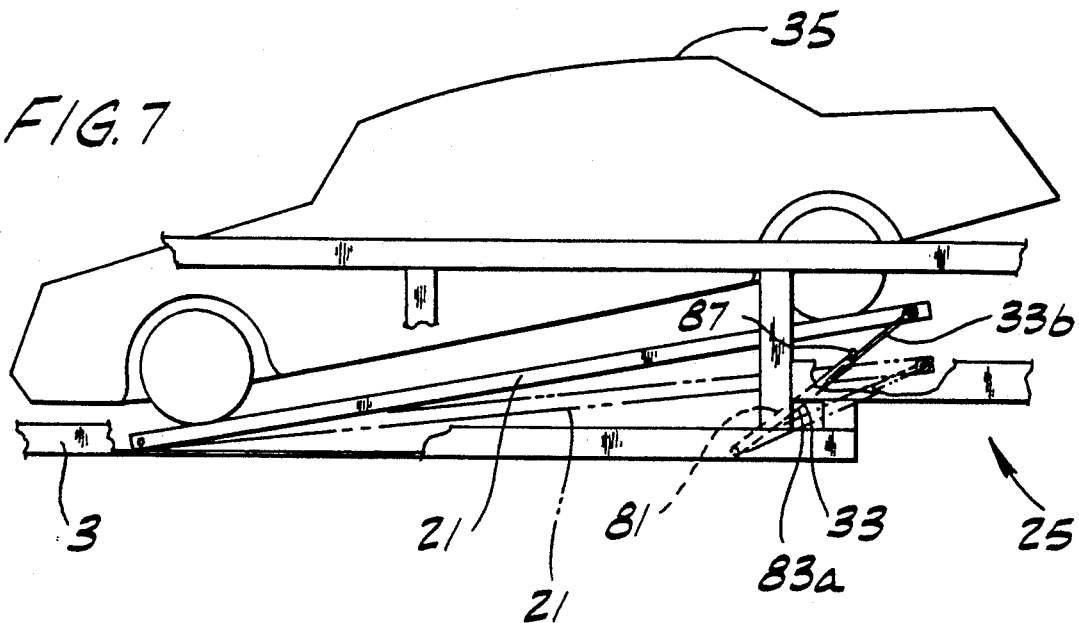
FIG. 7 is a side elevation of a lower platform in its forwardly tilted position with its lowered position shown in phantom.

Referring now to the drawings, there is generally indicated at 1 a vehicle carrier for carrying automobiles, trucks and the like comprising a chassis 3 having a front end 5 and a back end 7. Wheels 9 are mounted near the back end 7 of the chassis 3 for rotation relative to the chassis. The wheels 9 support the chassis 3 low to the ground for easy loading or unloading of vehicles. A trailer mount 11 depends in a downward direction from the front end 5 of the carrier for attaching the carrier to a tractor (not shown). Chassis 3 comprises a support structure having at least two longitudinally disposed rails 13, 15 in a spaced relation. Posts or braces 17 are spaced along the length of the carrier between rails 13, 15 for added structural support. Cross beams (not shown) connect the laterally opposite sides of the carrier.

The car carrier 1 further comprises lower and upper vehicle platforms (broadly first and second vehicle support means) 21, 23, respectively. The platforms are generally rectangular in shape in which one short end of a platform constitutes a front end and the other short end constitutes a back end thereof. Platforms 21, 23 are configured for receiving a car, truck or other like vehicle. FIGS. 1 and 2 show a carrier having four upper platforms and four lower platforms, however, it is to be understood that the carrier may have any number of upper and lower platforms and still fall within the scope of the present invention.

Associated with each platform 21, 23 are lifts (broadly mounting means) generally indicated at 25, 27, which mount the platforms on the chassis 3. As shown in FIG. 2, lifts 27 mount each upper platform 23 and allow them to move independently of the other upper platforms between a lowered position where each upper platform is adjacent its respective lower platform, a raised position spaced above the lower platforms, a forwardly tilted position and a rearwardly tilted position (see FIG. 6). Hydraulic cylinders (broadly power means) 29 associated with each lift 27 powers the movement of the upper platforms 23. A hydraulic power source 31 is located near the front end 5 of the chassis 3 as shown in FIG. 3 for supplying the hydraulic fluid needed to raise, lower and tilt the upper platforms.

Similarly, lifts 25 mount the lower platforms 21 to the chassis 3 and are adapted to selectively move them from a generally horizontal position as shown in FIG. 1 to either a forward or rearward tilting position about an axis extending generally transversely of the chassis. FIG. 2 shows the rear lower platform 21d tilting in a rearward position, and the front three platforms 21a, 21b and 21c in a forward tilting position (see also FIG. 7). As with the upper platforms, hydraulic cylinders 33 power the tilting movement of the lower platforms 21.

Vehicles 35 are loaded on the upper and lower platforms such that the forward end 37 of a vehicle on the last upper platform 23d is disposed generally under the rearward end 39 of the vehicle 35 on the second to last upper platform 23c, and so on for the last two upper platforms 23a and 23b. Similarly, the forward end 37 of a vehicle 35 on the second to last lower platform 21c is disposed generally under the rearward end 39 of the vehicle on the second lower platform 21b located forwardly of lower platform 21c. The other lower platform 21b is moved so that the forward end of the vehicle supported thereon is likewise positioned under the rearward end of the vehicle in front of it.

Turning now to FIGS. 4–6, each lift 27 comprises a plurality of support arms 41 which include two telescopically interconnected support arm sections 43a, 43b which allow the support arms to be lengthened by extension of one of the arm sections from the other and shortened by retraction of one of the arm sections into the other. The support arms 41 are connected to the chassis 3 outside of and adjacent to rails 13, 15 to provide greater lateral support. As shown in FIG. 4, an upper platform 23 has a first pair of support arms 41a including a lower arm section 43a pivotally mounted to the chassis 3 on a mounting block 45. One set of the pair of support arms 41 is mounted on one side of the chassis 3 adjacent one of the rails 13 while the other set is mounted on the respective laterally opposite side of the chassis adjacent the other rail 13. The first pair of support arms' 41a upper arm sections 43b are pivotally mounted to the upper platform 23 on respective laterally opposite sides of the chassis at the forward end 47 of the platform. These arms are especially adapted for resisting or countering a torque created at the forward end of a platform when the platform is forwardly tilted. A second pair of telescoping arms 41b similarly has lower arm sections 43a pivotally mounted on the chassis 3 by mounting block 49, which is substantially adjacent mounting block 45, and upper arm sections 43b pivotally mounted on respective laterally opposite sides at the rearward end 51 of upper platform 23. To provide additional stabilization, a third pair of telescoping arms 41c are pivotally mounted at the lower of their arm sections 43a on the chassis 3 by mounting block 53 at a location forward of mounting blocks 45, 49. The upper arm sections 43b of arms 41c are pivotally mounted to the upper platform on respective laterally opposite sides at the forward end 47 of the upper platform 23. Thus, after an upper platform 23 is raised, in order to tilt it forward, upper arm sections 43b of support arms 41a, 41c must be retracted. Likewise, in order to tilt an upper platform rearward, upper arm section 43b of support arms 41b must be retracted.

Lower arm section 43a for each support arm 41 is a hollow tubular member having an inner surface which is pivotally connected at one end thereof to the chassis 3 by a hinge 67 on mounting blocks 45, 49 and 53. Upper arm section 43b is slidably mounted in the lower arm section 43a, and is connected to the upper platform 23 by hinge 69. Each telescopic arm (i.e., arms 41a, 41b and 41c) includes a cylinder 29 for raising and tilting the upper platform. In FIG. 5, the cylinder 29 has fluid lines 71 connecting it to the hydraulic power source 31. The cylinder 29 powers the movement of the telescopic arm between the extended and retracted positions. A locking pin 73 locks the arm sections 43a, 43b in a selected position of extension by sliding into one of a plurality of openings 75 in upper arm section 43b for preventing the upper arm section from sliding downward in the lower arm section.

Figure 8:
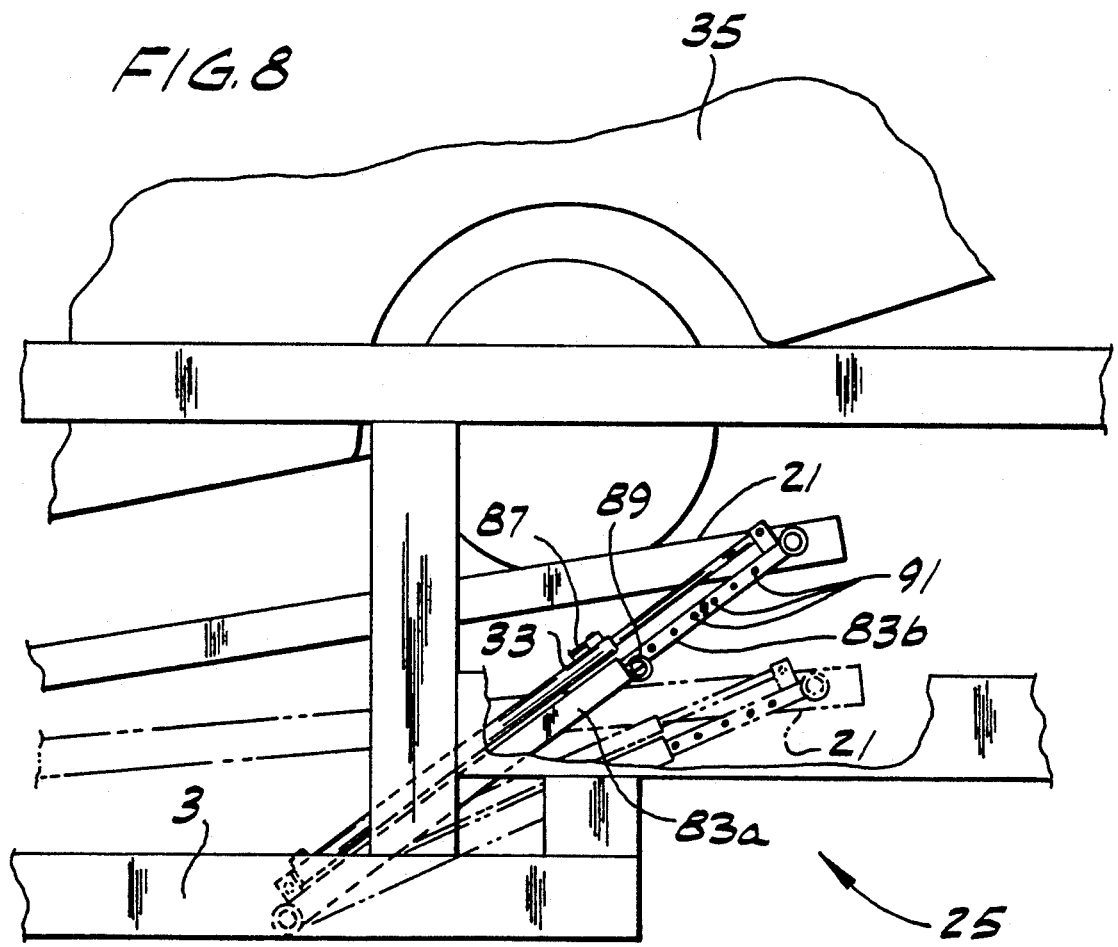
FIG. 8 is a detail of a telescopic arm used to tilt a lower platform.

As previously mentioned, lower platforms 21 pivot with respect to the chassis 3 along a transverse central axis of the platform substantially near the front of the platform for platforms 21a, 21b and 21c and near the rear of the platform for platform 21d. Support arms 81, similar to support arms 41, are connected to the platforms at the opposite end of its axis, and move the lower platforms between their level or horizontal position to their tilted positions. Each support arm 81 comprises a lower arm section 83a and an upper arm section 83b, which function the same way as arm sections 43a, 43b (see FIGS. 7 and 8). Upper arm section 83b is connected at an end to platform 21 and the other end is slidable in arm section 83a. The lower end of lower arm section 83a is connected to the chassis at a position generally central along the platform's transverse plane to a cross beam (arm section 43a is positioned outside of rail 15). Additionally, each support arm includes a hydraulic cylinder 33, for actuating the movement of the lower platform 21. Cylinder 33 is connected to the hydraulic power source by lines 87. Locking pins 89 lock the lower platforms 21 to the desired position through openings 91 in lower arm sections 83a in the same manner as the locking pins 71 lock the arm sections associated with the upper platforms 23.

In operation, a car carrier is loaded as follows. First the upper platforms 23 are moved to their lowered position so that they are disposed immediately above the lower platforms 21 (FIG. 1). A ramp (not shown) is placed at the back end 7 so that vehicles may be driven onto the carrier. A first vehicle 35 is driven onto the most forward upper platform 23a by driving the vehicle across the continuous surface formed by the upper platforms. The vehicle is temporarily secured and the upper platform 23a is raised to its highest position. In succession, upper platforms 23b, 23c and 23d have vehicles 35 loaded thereon and are raised to their highest positions. In this raised position, the forward end 37 of a vehicle 35 on the last upper platform 23d is disposed generally under the rearward end 39 of the vehicle 35 on a second to last of the upper platforms 23c, and so on. A vehicle 35 is then loaded onto the forwardmost lower platform 21a. Before the next vehicle is loaded on platform 21b, platform 21a is tilted so that the forward end 37 of a vehicle 35 on platform 21b may be positioned under the rearward end 39 of the vehicle on the forward lower platform 21a. Thereafter, platform 21b is tilted so that a vehicle may be received on platform 21c. For platform 21d, the rearward end 39 of a forward vehicle 35 located on platform 21c is generally adjacent to the forward end 37 of a vehicle 35 located on platform 21d. The vehicle loaded on lower platform 21d is tilted in a generally rearward direction.

Upon loading of all of the vehicles on the carrier, the upper platforms are lowered, and properly tilted, so that they are positioned immediately above the vehicles positioned on the lower platforms. This is accomplished by retracting upper arm sections 43b of support arms 41a, 41b and 41c. Generally, support arms 41a, 41c of platform 23d are retracted so that the platform is forwardly tilted and disposed over a vehicle positioned on lower platform 21d at a close proximity thereto. Next, platform 23c is lowered and forwardly tilted by retracting the support arms 41a, 41b and 41c associated therewith. Specifically, the upper arm sections 43b of support arms 41a, 41c are retracted more than upper arm section 43b of support arms 41b.

Once the platforms 21, 23 are in their desired positions, locking pins 73, 89 lock the upper arm sections 43b, 83b relative to the lower arm sections 43a, 83a of each hydraulic lift 25, 27. This stacking arrangement facilitates the permanent securing of the vehicles on to the platforms, in that the vehicles are positioned closer to the ground so that it is easy to reach the locking chains (not shown) which secure the vehicles to the platforms. In conventional car carriers, it is often difficult to perform this operation because one must actually climb onto the carrier. Longitudinal stability is provided by the third pair of telescopic arms 41c, while lateral stability provided by having the arms positioned outside of and adjacent rails 13, 15.

In view of the above, it will be seen that the several objects of the invention are achieved and other advantageous results attained.

As various changes could be made in the above constructions without departing from the scope of the invention, it is intended that all matter contained in the above description as shown in the accompanying drawing shall be interpreted as illustrative and not in a limiting sense.

What is claimed is:

1. A vehicle carrier for carrying vehicles, the vehicle carrier comprising:
   a chassis having a front end and a rear end;
   wheels mounted on the chassis for rotation relative thereto and for supporting at least a portion of the chassis low to the ground for easy loading or unloading of vehicles;
   lower vehicle support means;
   first means mounting said lower vehicle support means on the chassis;
   upper vehicle support means disposed generally above the lower vehicle support means, said upper vehicle support means comprising a plurality of upper platforms;
   second means mounting said upper vehicle support means on the chassis for movement of each of the upper platforms relative to the chassis independently of the other upper platforms between a lowered position adjacent said lower vehicle support means and the chassis, a raised position spaced above said lower vehicle support means and the chassis, a forwardly tilted position and a rearwardly tilted position relative to the chassis,
   said upper vehicle support means being free of connection to any rigid support structure located above the chassis and fixed in a vertical position relative to the chassis whereby the highest point on said upper vehicle support means in any of said positions of said vehicle support means defines the highest vertical extension of the carrier; and
   power means associated with said second mounting means for powering the movement of the upper platforms, said power means being operable to move the upper platforms such that the forward end of a vehicle support on a first of the upper platforms is disposed generally under the rearward end of a vehicle supported on a second of the upper platforms located forwardly of said first upper platform,
   said second means mounting the upper platforms comprising a plurality of support arms, each support arm including at least two telescopically interconnected arm sections such that each support arm may be lengthened by extension of one of the arm sections from the other and shortened by retraction of one of the arm sections into the other, a first pair of the support arms having a lower of their arm sections pivotally mounted to the chassis on respective laterally opposite sides thereof, and having a higher of their arm sections pivotally mounted to one of the upper platforms on respective laterally opposite sides thereof generally at the forward end of said one upper platform, a second pair of the support arms having a lower of their arm sections pivotally mounted to the chassis on respective laterally opposite sides thereof, and a higher of their arm sections pivotally mounted to said one upper platform on respective laterally opposite sides thereof generally at the rearward end of said one upper platform, and a third pair of support arms having a lower of their arm sections pivotally mounted on the chassis generally below the rearward end of said one upper platform, and having a higher of their arm sections pivotally mounted to said one upper platform on respective laterally opposite sides thereof generally at the forward end of said one upper platform.

2. A vehicle carrier as set forth in claim 1 wherein said power means comprises a cylinder for each of the support arms for powering the extension and retraction of the arm sections of the support arm.

3. A vehicle carrier as set forth in claim 2 further comprising means for locking the arm sections of the support arms in a selected position of extension.

4. A vehicle carrier for carrying vehicles, the vehicle carrier comprising:
   a chassis having a front end and a rear end;
   wheels mounted on the chassis for rotation relative thereto and for supporting at least a portion of the chassis low to the ground for easy loading or unloading of vehicles;
   vehicle support means disposed generally above the chassis, said vehicle support means comprising a plurality of platforms;
   means mounting said vehicle support means on the chassis for movement of each of the platforms relative to the chassis independently of the other platforms between a lowered position adjacent the chassis, a raised position spaced above the chassis, a forwardly tilted position and a rearwardly tilted position relative to the chassis,
   said vehicle support means being free of connection to any rigid support structure location above the chassis and fixed in a vertical position relative to the chassis whereby the highest point on said vehicle support means in any of said positions of said vehicle support means defines the highest vertical extension of the carrier; and power means associated with said mounting means for powering the movement of the platforms, said power means being operable to move the platforms such that the forward end of a vehicle supported on a first of the platforms is disposed generally under the rearward end of a vehicle supported on a second of the platforms located forwardly of said first platform, said means mounting said vehicle support means comprising a plurality of support arms, each support arm including at least two telescopically interconnected arm sections such that each support arm may be lengthened by extension of one of the arm sections from the other and shortened by retraction of one of the arm sections into the other, a first pair of the support arms having a lower of their arm sections pivotally mounted to the chassis on respective laterally opposite sides thereof, and having a higher of their arm sections pivotally mounted to one of the platforms on respective laterally opposite sides thereof generally at the forward end of said one platform, a second pair of the support arms having a lower of their arm sections pivotally mounted to the chassis on respective laterally opposite sides thereof, and a higher of their arm sections pivotally mounted to said one platform on respective laterally opposite sides thereof generally at the rearward end of said one platform, and a third pair of support arms having a lower of their arm sections pivotally mounted on the chassis generally below the rearward end of said one platform, and having a higher of their arm sections pivotally mounted to said one platform on respective laterally opposite sides thereof generally at the forward end of said one platform.

5. A vehicle carrier as set forth in claim 4 wherein said power means comprises a cylinder for each of the support arms for powering the extension and retraction of the arm sections of the support arm.

6. A vehicle carrier as set forth in claim 5 further comprising means for locking the arm sections of the support arms in a selected position of extension.

7. A vehicle carrier for carrying vehicles, the vehicle carrier comprising:

a chassis having a front end and a rear end;

wheels mounted on the chassis for rotation relative thereto and for supporting at least a portion of the chassis low to the ground for easy loading or unloading of the vehicles;

vehicle support means disposed generally above the chassis, said vehicle support means comprising a plurality of platforms;

means mounting said vehicle support means on the chassis for movement of each of the platforms relative the chassis independently of the other platforms between a lowered position adjacent the chassis, a raised position spaced above the chassis, a forwardly tilted position and a rearwardly tilted position relative the chassis; and power means associated with said mounting means for powering the movement of the platforms;

said means mounting the platforms comprising a plurality of support arms, each support arm including at least two telescopically interconnected arm sections such that each support arm may be lengthened by extension of one of the arm sections from the other and shortened by retraction of one of the arm sections into the other, a first pair of the support arms having a lower of their arm sections pivotally mounted to the chassis on respective laterally opposite sides thereof, and having a higher of their arm sections pivotally mounted to one of the platforms on respective laterally opposite sides thereof generally at the forward end of said one platform, a second pair of the support arms having a lower of their arm sections pivotally mounted to the chassis on respective laterally opposite sides thereof, and a higher of their arm sections pivotally mounted to said one platform on respective laterally opposite sides thereof generally at the rearward end of said one platform, and a third pair of support arms having a lower of their arm sections pivotally mounted on the chassis generally below the rearward end of said one platform, and having a higher of their arm sections pivotally mounted to said one platform on respective laterally opposite sides thereof generally at the forward end of said one platform.

* * * * *